March 18, 1969     E. J. BARTHOLET     3,433,265

BALANCED ROTARY VALVE

Filed Feb. 27, 1967     Sheet 1 of 2

INVENTOR,
EMIL J. BARTHOLET
BY Watson, Cole, Grindle & Watson
ATTORNEYS

March 18, 1969  E. J. BARTHOLET  3,433,265
BALANCED ROTARY VALVE
Filed Feb. 27, 1967
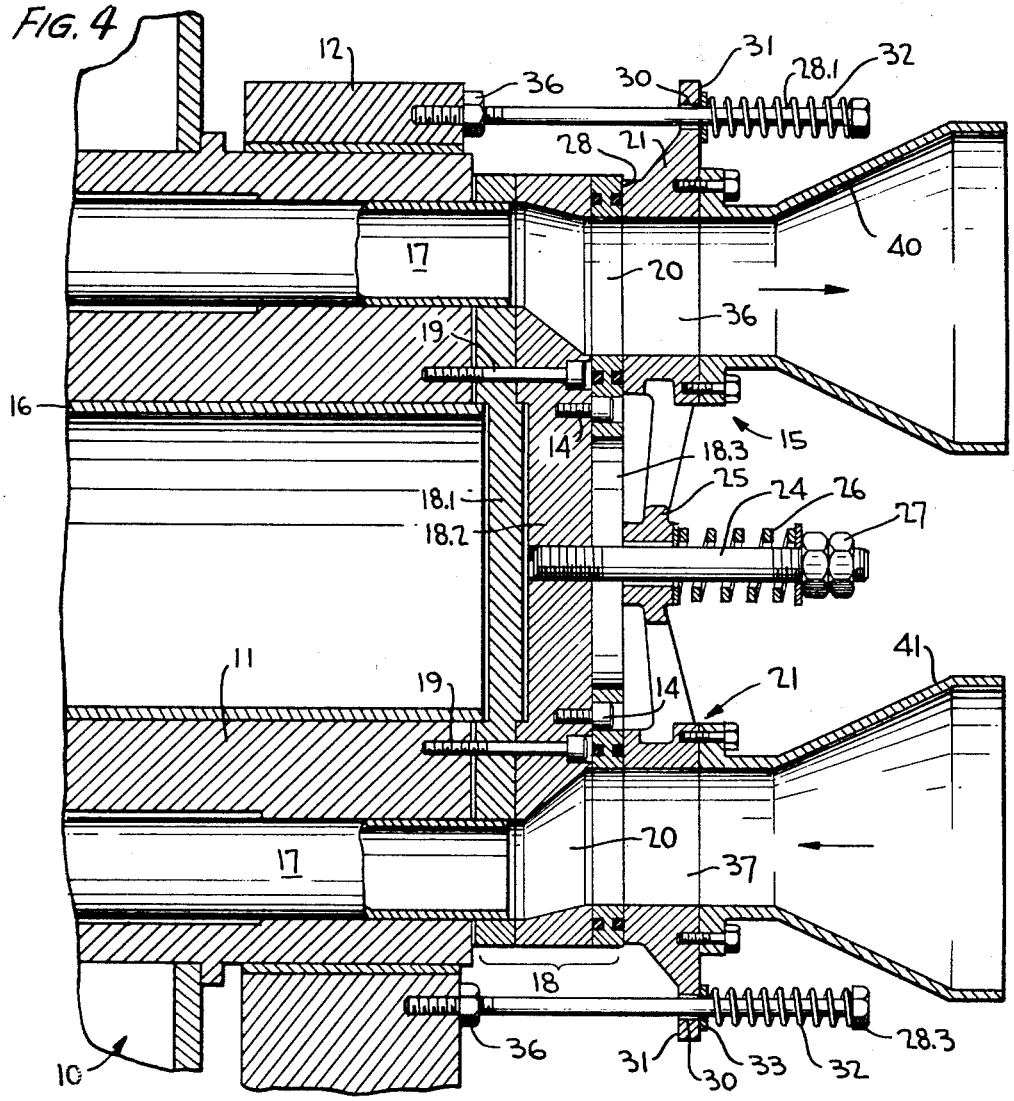
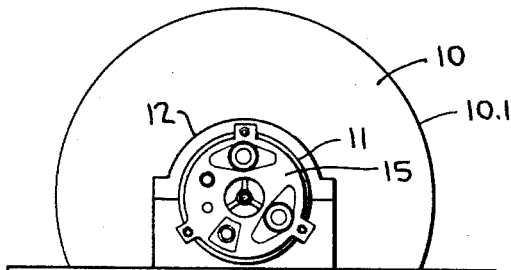
INVENTOR,
EMIL J. BARTHOLET
BY
Watson, Cole, Grindle & Watson
ATTORNEYS United States Patent Office 3,433,265
Patented Mar. 18, 1969

3,433,265
BALANCED ROTARY VALVE
Emil J. Bartholet, Leonia, N.J., assignor to Komline-Sanderson Engineering Corp., Peapack, N.J., a corporation of New Jersey
Filed Feb. 27, 1967, Ser. No. 618,985
U.S. Cl. 137—625.18         10 Claims
Int. Cl. F16k 3/08

ABSTRACT OF THE DISCLOSURE

A rotary filter valve in which the valve members are arranged for constant relative rotation about a fixed axis and are urged into axial contact at their interface. The members are provided with a plurality of parts at different angular locations of the interface and respectively in communication with the different pressure sources. To counteract the tilting tendency caused by the unequal fluid pressures between the valve members, there are provided means, such as springs, spaced angularly around the rotational axis and arranged to urge the members axially toward each other at the respective spring locations with different axial forces which are so related to the axial forces resulting from fluid pressure at the respective locations as to achieve a substantially uniform axial engagement pressure between the valve members at all locations around their interface.

There is also included a novel association of O-rings with the valve members for providing an improved seal capable of self-adjustment to compensate for wear, and to occupy and seal spaces between the opposed surfaces of the valve members due to slight separation of said members.

Background of the invention

In rotary valves such as used in rotary drum filters and the like, the valves are employed to transmit varying positive and/or negative pressures in succession to different portions of the drum incident to its rotation.

Customarily, one of the valve members is affixed coaxially to the filter drum and is provided with axially opening passages or ports which communicate with the various filtrate compartments in the drum.

A second valve member is supported against rotation but in axial alignment and axial abutting relation to the rotating valve member and is provided with a plurality of ports at different angular locations about the axis. These ports open into the interface between the valve members in position for successive registration with the ports of the rotating member and have relatively different fluid pressures transmitted to them from different sources of suction and/or pressure with which they are respectively adapted to communicate at all times.

Normally, the two valve members are urged axially into engagement by axial forces which are uniform in magnitude, and concentrically disposed around the valve axis, to exert a uniform axial pressure between the valve members at all angular locations around their axis of relative rotation.

The function of the rotary valve is to transmit varying positive and/or negative pressures in succession to the various filtrate compartments of the drum during the angular movement of each compartment throughout a predetermined portion of the drum rotation. For instance, the arrangement may be such that each filtrate compartment is subjected to a sub-atmospheric or negative pressure as it rotates through the liquid in which the lower portion of the drum is immersed to draw liquid through the filter media onto the drum. Thereafter, as the particular filtrate compartment emerges from the liquid and continues its rotation, it is further subjected to sub-atmospheric or negative pressure which may, if desired, be somewhat greater than that employed during its movement through the liquid, all to the end that a substantial volume of drying air may be drawn into the drum through the filter cake thereon. Also, it may be desirable to supply either liquid or air through the filter valve for outward passage under pressure through the filter media to remove or discharge the filter cake and/or for backwash purposes in cleaning the filter media as it starts its rotational movement through the liquid to be filtered.

I have found that the varying positive and negative pressures thus transmitted through the valve and acting thereon at different angular locations around the interface between the two valve members exert on the said members internal axial forces at different angular locations which are neither equal nor symmetrical. As a result, these internal forces normally will impose a resultant tilting force between the valve members in a plane coincident with the axis about which their relative rotation occurs. In view of the constant relative rotation of the members, under such unbalanced or eccentrically loaded condition, they will normally tend to wear unevenly at their interface. In other words, the most rapid rate of wear will occur at the location in which the heaviest engagement, or pressure, between the valve members occurs. Thus, the valve will be subjected to accelerated wear and leakage.

Summary of the invention

In accordance with the present invention, it has been found that such unbalanced and unequal wear of the valve parts may readily be eliminated by applying, to the valve members, means for urging the valve members together in each of a plurality of angular locations around their rotational axis with relatively different axial forces which are so related to the axial forces caused by fluid pressure at such locations as to achieve a substantially uniform axial engagement pressure between the members at all angular locations around their interface. The interengaged surfaces of the valve members, in other words, will be maintained in fluid-tight engagement with each other at a pressure which is uniform throughout the entire angular extent of the interface.

A further feature of the invention contributing to the longevity of the valve life is the provision of a novel simplified sealing means capable of self-adjustment to automatically compensate for wear whereby to retain its efficiency over an extended period of time in maintaining the valve leak free. Such improved means comprises O-rings respectively housed in grooves in one of said members at their interface and on opposite radial sides of the respective valve ports. These O-rings are of a resiliently compressible material so proportioned that normally they tend to project slightly from their respective grooves but are fully compressed into them by axial pressure of the other member of the valve member. Thus, during relative rotation between the members, the sealing rings are resiliently urged in fluid-tight engagement with the respective members. Any wear on the rings, as well as slight local separations between the normally contacting surfaces of the valve members, is compensated for by expansion of each ring in a direction outwardly of its groove to maintain its resilient fluid-tight engagement with the cooperating valve member.

Brief description of the drawings

In the accompanying drawings.

FIGURE 4 is a fragmentary section on the line 4—4 through the filter valve and the associated end portion of the filter drum with which it is associated; and FIGURE 5 is a generally diagrammatic end elevation on a reduced scale illustrating the manner in which the invention is incorporated in a generally conventional rotary drum filter unit.

*Description of the preferred embodiment*

Figure 1:
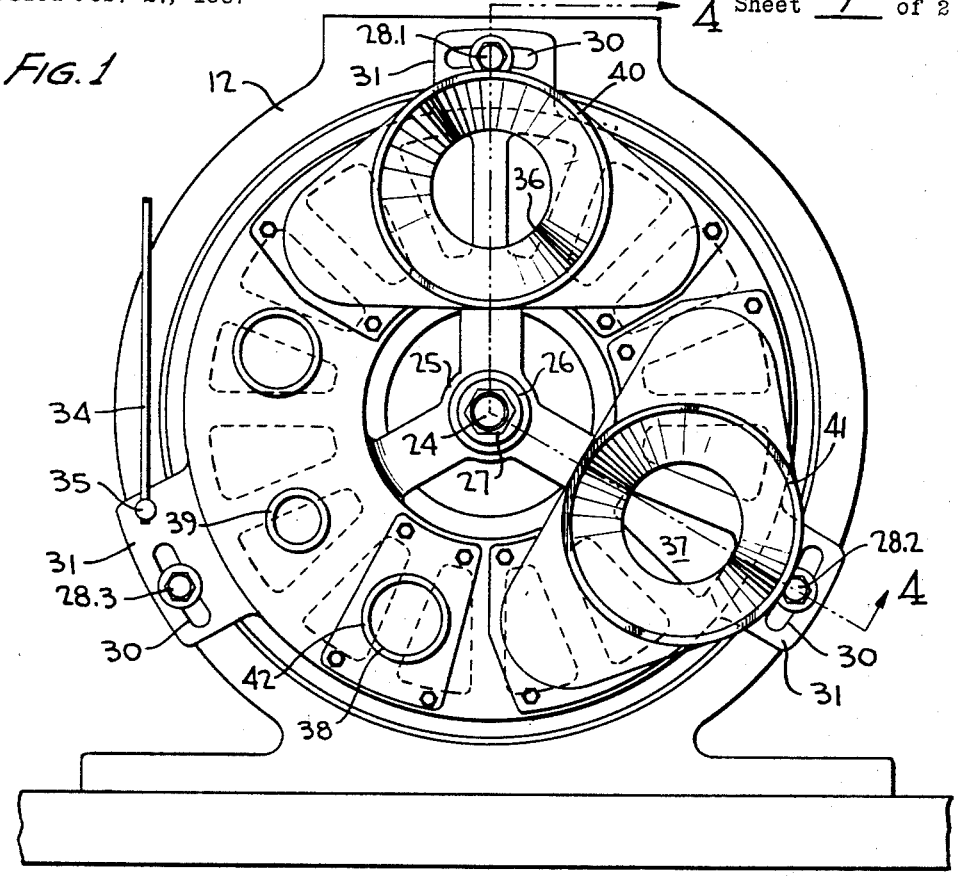
FIGURE 1 represents an end elevation of a rotary balanced filter valve in accordance with the preferred embodiment of the invention.
Figure 2:
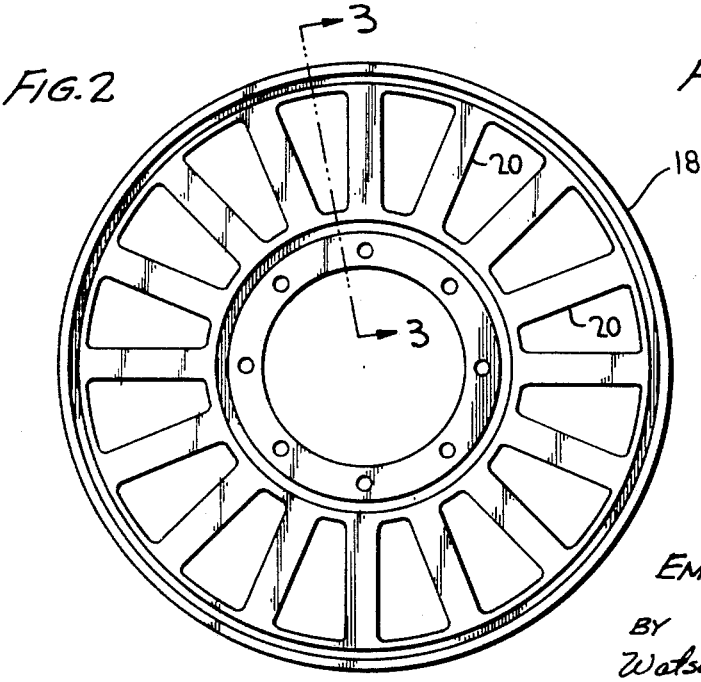
FIGURE 2 is a front elevation of the preferred form of wear plate as employed in such a valve.
Figure 3:
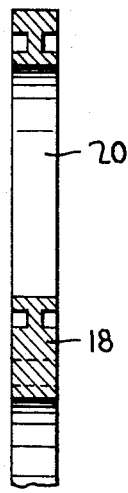
FIGURE 3 is an enlarged fragmentary section on the line 3—3 of FIGURE 2.

The invention is herein described in its preferred use as part of a rotary drum type filter unit such as is illustrated diagrammatically in FIGURE 5. Except for the filter valve, such a unit is of purely conventional construction, comprising a filter drum 10 of cylindrical shape supported by trunnions such as 11 at its opposite axial ends in bearings such as 12 for rotation about a horizontal axis. The filter structure also includes a tank or vat 13 on which the bearings 12 may be supported, whereby the lower portion of the filter drum is immersed in a supply of liquid to be filtered.

It will be understood that, in accordance with usual practice, the cylindrical surface of the filter drum 10 is covered by a suitable porous filter media designated generally at 10.1 in FIGURE 5. Further, as will be readily apparent to those skilled in the art (though not specifically shown herein), the drum is formed or subdivided beneath the filter media into a plurality of filtrate compartments, each opening outwardly of the drum toward the filter media. Normally, these filtrate compartments occupy uniform angular subdivisions or sectors of the drum and are provided with suitable passages or conduits through which various positive and/or negative pressures may be transmitted through the filter valve 15 associated with the trunnion 11 as seen in FIGURES 4 and 5.

Referring now to FIGURES 1 through 4, the trunnion 11 is mounted on a large diameter rigid pipe 16 constituting the central structural member of the filter drum 10. The axially presented drum head or end 10.2 of the drum is concentrically fixed to the trunnion 11 as shown. It will be readily understood that the opposite end of the drum will have a similar trunnion 11, such as shown in FIGURE 4, on which its associated drum head also is concentrically mounted.

It will be seen by reference to FIGURE 4 that the trunnion is formed with internal passages through which extend the axially parallel pipes 17, which will be understood to establish communication between the valve 15 and the respective filtrate compartments of the filter drum. These pipes are arranged in annular series around and concentric with the drum axis. Their free ends project somewhat from the trunnion 11 for snug fluid-tight reception in openings in a disc-like pipe plate 18.1 which is secured over the axial end of the pipe 16 and trunnion 11, as by means of the screws 19. These screws 19 may also serve to secure a valve face plate 18.2 over the pipe plate 18.1, whereby the valve face plate 18.2 and the pipe plate 18.1 cooperate to define a rotary valve member 18 which rotates together with the filter drum.

Also, it is desirable to provide the valve member 18 with a wear plate 18.3 which is supported by the studs 14 for axial movement on and for rotation with the face plate 18.2. The valve member 18 is formed with an annular series of valve ports 20 extending from the respective pipes 17 and opening axially through the pipe plate 18.1, face plate 18.2, and wear plate 18.3.

Formed in the opposite faces of the wear plate are pairs of concentric grooves within which are disposed the O-rings 18.4 and 18.5, respectively surrounding and encircled by the annular series of valve ports 20.

These O-rings are of resiliently deformable material, such as natural or artificial rubber or other elastomer. Each O-ring has a normal axial dimension somewhat greater than the depth of the groove in which it is seated, so that the O-rings will be compressed axially into their grooves by engagement with the opposing faces of the respective valve members 18 and 21 respectively.

For convenience of reference, and since it rotates with the valve member 18, the wear plate 18.2 is here designated as part of member 18, though it is compressed axially between and forms a seal with both valve members 18 and 21.

Threaded into the face plate 18.2 is a center stud 24 on which the non-rotating valve member 21 is axially slidably and rotatably mounted by means of its central hub 25. For urging the valve members axially into engagement at their interface 22, a tensioning spring 26 is disposed on the center stud under compression between the hub and the tension adjusting lock nuts 27 on the free end portion of the stud. The interface is provided by the axially opposed surfaces of the rotating and non-rotating valve members 18 and 21. Such surface of the rotating valve member is defined in the present embodiment by the wear plate 18.3.

Valve member 21 is assembled to the member 18 by means of bolts 28.1, 28.2 and 28.3, which are slidably disposed through apertured radial projections 31 of the member 21 and threaded into the bearing member 12.

Disposed on the bolts, for compression between the head of each bolt and the valve member 21, are the balancing springs 32. The bolts 28.1, 28.2 and 28.3 are relatively adjusted by rotating them more or less into or from the bearing 12 to apply varying degrees of pressure to the springs, such that the combined spring pressures and internal fluid pressure will cause the valve members to be interengaged at substantially uniform axial pressures around and concentrically to their common rotational axis, here defined by the center stud 24.

In accordance with known practice, the openings 30 through the respective projections 31 of the valve member 21 are arcuate and concentric to the center stud 24 to permit a limited degree of angular adjustment of the valve member 21 for the purpose of varying the timing of the valve functions with respect to the filtrate compartments of the drum. Such angular adjustment is transmitted through a conventional control rod 34, shown fragmentarily in FIGURE 1, same being eccentrically pivoted at 35 to the member 21.

Formed through the valve member 21 for registration with the successive ports 20 of the rotating valve member are a plurality of ports such as 36, 37, 38 and 39. The particular arrangement of these ports is set forth merely by way of illustration and is subject to considerable variation without departing from the invention, the purpose merely being to exemplify various ports or passages at different angular locations for transmitting varying fluid pressures through the valve to the respective ports 20 of the rotating valve member. Thus, for instance, a negative pressure or suction may be transmitted to the port 36 from any suitable vacuum source, by means such as the fitting 40. The port 37 is provided with a fitting or adapter coupling 41 which exemplifies means for transmitting to it a somewhat lower negative pressure than is employed in connection with the port 36.

Port 38, on the other hand, is adapted for connection by means of a fitting 42 to a source of backwash liquid under pressure, while the port 39 is vented to the atmosphere through the outer end face of the valve body or member 31.

Thus, as the filter drum rotates in a counterclockwise direction with reference to FIGURES 1 and 5 respectively, the valve port 37 will transmit a sub-atmospheric pressure through the valve and through those pipes 17 which lead to the submerged filtrate compartments of the filter drum 10, to thus draw the liquid from the tank 13 through the filter media 10.1, causing the solids from said liquid to be deposited in the form of a filter cake on the filter media. As the respective compartments emerge from the liquid and continue their rotation in a counterclockwise direction, a preferably still greater sub-atmospheric pressure is transmitted through the port 36 of the valve to the respective filtrate compartments whereby to draw a substantial volume of air through the filter cake for drying and continued removal of water. Then, as the respective compartments move back down toward the tank, their respective pipes 17 are successively connected with the port 39 which may be vented to the atmosphere to facilitate removal of the filter cake, following which they are subjected to a backwash liquid pressure through the port 38 as the filter drum again begins its immersion in the liquid preparatory to a new filtering cycle.

The precise order of subjecting the filtrate compartments to the varying pressures, as well as the nature and extent of the respective pressures, is not material to the present invention. These are given merely by way of exemplification to facilitate a rapid understanding of the present invention. In any event, it will be apparent that the operation of the filter is such as to require the transmission of relatively different fluid pressures through the respective ports of the non-rotating valve member 21. Since these pressures are transmitted across the valve interface 22 at different angular locations, they will obviously produce internal axial fluid pressure forces which tend to vary the engagement pressure between the axially opposed end surfaces of the valve members at different angular locations around the interface 22.

Such unbalanced engagement or loading of the valve members will thus occur because of the different fluid pressures within the valve if, in accordance with usual practice, the springs 32 are uniformly compressed to apply equal thrusts against the valve member 21.

In order to counteract the unbalancing forces produced by these fluid pressures, there is provided a means for exerting axial forces on the non-rotating valve member 21 at each of a plurality of angularly spaced locations around the valve axis. The magnitude and direction of the counteracting forces applied at these last-mentioned locations are so related to the different internal fluid pressure forces resulting at the same locations as to achieve a substantially uniform axial engagement pressure between the valve members at all angular locations around their interface 22.

Thus, by reference to the present specific embodiment of the invention, it will be seen that the counterbalancing means above referred to comprises the springs 32. The degree of compression of each spring will be varied as necessary through rotation of its associated bolt whereby to thread the same into or out of the bearing 12. Adjustment of each bolt may be maintained in conventional manner by means of a lock nut 36 threaded thereon.

It will be noted that the spring 32 and its associated bolt 28.1 are located in a radial plane of the valve coincident with that in which the greatest subatmospheric pressure or degree of vacuum is transmitted through the port 36 to the valve interface 22. Thus, the local area of the valve body 21 around and near the angular location of the port 36 is urged into engagement with the cooperating valve member 18 by the atmospheric pressure externally of the valve as well as by the force of the compression spring 32. In some instances, the engagement pressure between the valve members at this location will be sufficient, and will not require to be supplemented by spring pressure. In such event, the spring 32 may be omitted or removed, as its bolt 28.1 is so adjusted that no compression is applied to this spring.

However, at the angular location of the port 37, the degree of sub-atmospheric pressure or vacuum transmitted through that port is somewhat less than at the port 36 and the differential pressure tending to force the valve members together at this angular location will accordingly be less than at the port 36. Therefore, in order to supplement this to provide an engagement pressure at this angular location equal to that at the port 36, the spring 32 at this location is brought under compression to an appropriate degree by adjustment of its associated bolt 28.2.

At the angular location of the remaining spring 32, the forces tending to bring the valve members into engagement will be substantially less than at each of the other two locations, due to the introduction of backwash liquid at substantial pressure through the relatively adjacent port 38. Accordingly, the cooperating bolt 28.3 will require to be threaded even more tightly into the bearing 12 to provide an even greater compression of its spring than at the preceding location in order that the engagement pressure between the valve members may be equal at this angular location with that at the other two angular locations earlier referred to.

Obviously, the degree of tightening of the respective bolts, with consequent adjustment of their respective springs, will vary widely in accordance with various factors, such as the strength of the springs, the pitch of the threads, the relative positive or negative pressures introduced through the respective ports, and the number and disposition of such ports. Thus, although no precise formula can be given, adjustment of the spring pressures for the purposes of the invention is readily achievable. In accordance with the invention, a balanced condition of the valve may be obtained through adjustment of the respective spring compressions so that the degree of force required to force the valve members apart at each of the projections 31 will be uniform when the filter is in operation. The spring 26 may at this time be adjusted to be inactive, or in other words, fully expanded.

Once the compression of the springs 32 is adjusted to obtain the proper balanced condition of the valve, the spring 26 may have its compression adjusted to any desired degree through obvious manipulation of its associated stud 24 and lock nuts 27 to vary the over-all axial thrust of the valve members against each other.

The resulting balanced condition of the valve will insure uniform wear of the valve members at their interface; although, in the event of imperfect or inaccurate finishing of the respective faces, or of careless adjustment of the springs 32, such as to result in slight spacing between the valve members at one or more angular locations around their interface, the resiliently compressed O-rings will project axially outwardly from their respective grooves to maintain contact and sealing engagement between the respective parts nevertheless. By virtue of this same ability of the O-rings to project from their grooves, they will automatically compensate for wear occurring on the O-rings themselves.

Having thus described my invention, I claim:

1. A rotary filter valve comprising a pair of valve members mounted for relative rotation about a common axis, said members having axially opposed surfaces in rubbing engagement with each other at their interface, said members respectively being provided with a plurality of ports at different angular locations around said axis for successive communication with each other across said interface, means transmitting relatively different fluid pressures to the respective ports of one said member for transmission across said interface at different angular locations and producing internal axial forces within the valve which tend to vary the engagement pressure between said opposed surfaces at the respective locations, in combination with means exerting external axial forces on said members at each of a plurality of angularly spaced locations around their common axis, the magnitude and direction of the external axial forces being so related to the different internal axial forces caused by fluid pressure as to achieve a substantially uniform axial engagement pressure between the valve members at all angular locations around their interface.

2. A rotary filter valve as defined in claim 1, in which said means exerting external axial forces comprises a plurality of springs respectively urging said valve members resiliently toward each other at said locations.

3. A rotary filter valve as defined in claim 2, including means for effecting selective adjustment of the axial force exerted by each said spring, and in which said locations are concentric to the common axis of the members.

4. A rotary filter valve as defined in claim 3, in which there are at least three of said springs substantially equi-angularly located around and concentrically to the said common axis.

5. A rotary filter valve as defined in claim 3, including a further means, adjustable independently of said means exerting external axial forces, said further means exerting an axial force coincident with said common axis, whereby variations of said last-mentioned axial force will not affect the relative adjustments of said springs.

6. A rotary filter valve as defined in claim 5, wherein said internal axial force at one angular location with respect to the common axis of said members is provided by a negative fluid pressure transmitted across the interface at said one angular location, said last-mentioned internal force and the said further means jointly providing the entire resultant force urging the valve members together at said location, whereby to produce an axial engagement force between the members at said location which is equal to the engagement forces between the members at each of said other locations.

7. A rotary filter valve as defined in claim 1, in which said ports are arranged concentrically to said axis, one of said members including a wear plate through which said ports extend, said wear plate being formed with a pair of radially spaced grooves internally and externally respectively of said annularly arranged ports, and O-rings of resiliently compressible material of normally greater diameter than the depths of said grooves, said O-rings being compressed axially into said grooves by engagement with the other said valve member whereby to expand from their respective grooves to occupy and seal any spaces occurring between the respective members and to compensate for wear on the O-rings.

8. A rotary filter valve as defined in claim 7, in which the wear plate is supported on one of the valve members for free axial movement, and secured against rotary movement relative to said one member, the wear plate being provided with said O-rings and grooves on each of its axially presented faces, for equalized axial sealing engagement with the respective valve members when the wear plate is subjected to axial pressure between said members.

9. A rotary filter valve as defined in claim 7, in which said means exerting external axial forces are resilient means, and are adjustable, said locations being concentric to the common rotational axis of said members.

10. A rotary filter valve as defined in claim 7, including a further means, independent of said means exerting external axial forces, which exerts an axial force coincident with said axis urging said members together.

References Cited

UNITED STATES PATENTS

| | | | |
|---|---|---|---|
| 1,519,670 | 12/1924 | Danstrup | 251—180 XR |
| 2,582,752 | 1/1952 | Harr | 251—180 XR |
| 3,040,777 | 6/1962 | Carson et al. | 251—180 XR |
| 3,114,393 | 12/1963 | Vlasic | 137—625.18 |
| 3,220,554 | 11/1965 | Burchert et al. | 210—395 XR |

WALTER A. SCHEEL, *Primary Examiner.*

R. I. SMITH, *Assistant Examiner.*

U.S. Cl. X.R.

210—395; 251—180